(12) United States Patent
Sahinoglu et al.

(10) Patent No.: US 12,071,323 B2
(45) Date of Patent: Aug. 27, 2024

(54) CONTACTLESS ELEVATOR SERVICE FOR AN ELEVATOR BASED ON AUGMENTED DATASETS

(71) Applicant: Mitsubishi Electric Research Laboratories, Inc., Cambridge, MA (US)

(72) Inventors: Zafer Sahinoglu, Costa Mesa, CA (US); Kuan-Chuan Peng, Charlestown, MA (US); Alan Sullivan, Middleton, MA (US); William Yerazunis, Acton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1046 days.

(21) Appl. No.: 16/994,779

(22) Filed: Aug. 17, 2020

(65) Prior Publication Data

US 2022/0048733 A1 Feb. 17, 2022

(51) Int. Cl.
*B66B 1/46* (2006.01)
*B66B 1/28* (2006.01)
(Continued)

(52) U.S. Cl.
CPC ............... *B66B 1/468* (2013.01); *B66B 1/28* (2013.01); *B66B 1/3461* (2013.01); *B66B 3/002* (2013.01);
(Continued)

(58) Field of Classification Search
CPC ......... B66B 1/468; B66B 1/28; B66B 1/3461; B66B 3/002; B66B 2201/101;
(Continued)

(56) References Cited

U.S. PATENT DOCUMENTS 9,738,489 B2 8/2017 Finsch et al.
10,189,677 B2 1/2019 Bryant et al.
(Continued)

FOREIGN PATENT DOCUMENTS

CN 102009879 4/2011
CN 106564788 4/2017
(Continued)

*Primary Examiner* — Joseph J Dallo
(74) *Attorney, Agent, or Firm* — Gene Vinokur; Hironori Tsukamoto

(57) ABSTRACT

Systems, methods and devices for real-time contactless elevator service operation of an elevator includes a trained neural network (TNN) model. The TNN model is trained using a training processor with augmented datasets as a synthetic training dataset, to later perform elevator identifier recognition. The augmented data sets are generated from synthetic text images, the synthetic text images are augmented with different geometrical parameters and visual parameters to a predetermined number of variations in appearance to a set of training elevator identifiers. A camera captures a user image. A text image portion from the user image is extracted using the TNN model, and detects an elevator identifier in the extracted text image portion using the extracted text image portion and the TNN model. The detected elevator identifier is displayed for user confirmation or user cancellation, and upon user confirmation, generates a control command based the detected elevator identifier associated with an elevator service.

30 Claims, 7 Drawing Sheets

(51) Int. Cl.
- *B66B 1/34* (2006.01)
- *B66B 3/00* (2006.01)
- *G06F 3/14* (2006.01)
- *G06F 18/214* (2023.01)
- *G06N 3/04* (2023.01)
- *G06N 3/08* (2023.01)
- *G06V 10/44* (2022.01)
- *G06V 20/62* (2022.01)
- *H04N 23/54* (2023.01)
- *G06V 30/10* (2022.01)

(52) U.S. Cl.
CPC .............. *G06F 3/14* (2013.01); *G06F 18/214* (2023.01); *G06N 3/04* (2013.01); *G06N 3/08* (2013.01); *G06V 10/44* (2022.01); *G06V 20/62* (2022.01); *H04N 23/54* (2023.01); *B66B 2201/101* (2013.01); *B66B 2201/103* (2013.01); *B66B 2201/4615* (2013.01); *B66B 2201/4623* (2013.01); *B66B 2201/4638* (2013.01); *B66B 2201/4653* (2013.01); *G06V 30/10* (2022.01)

(58) Field of Classification Search
CPC ...... B66B 2201/103; B66B 2201/4615; B66B 2201/4623; B66B 2201/4638; B66B 2201/4653; G06F 3/14; G06F 18/214; G06N 3/04; G06N 3/08; G06V 10/44; G06V 20/62; G06V 30/10; H04N 23/54
See application file for complete search history.

(56) References Cited

U.S. PATENT DOCUMENTS

| | | | |
|---|---|---|---|
| 2018/0052520 A1* | 2/2018 | Amores Llopis | G06F 3/0304 |
| 2018/0141779 A1 | 5/2018 | Fauconnet | |
| 2023/0050825 A1* | 2/2023 | Plikynas | G01C 21/3856 |
| 2023/0188384 A1* | 6/2023 | Claffey | H04L 25/022 |
| | | | 375/262 |

FOREIGN PATENT DOCUMENTS

| | | |
|---|---|---|
| CN | 111153301 | 3/2020 |
| CN | 112960497 A * | 6/2021 |

* cited by examiner

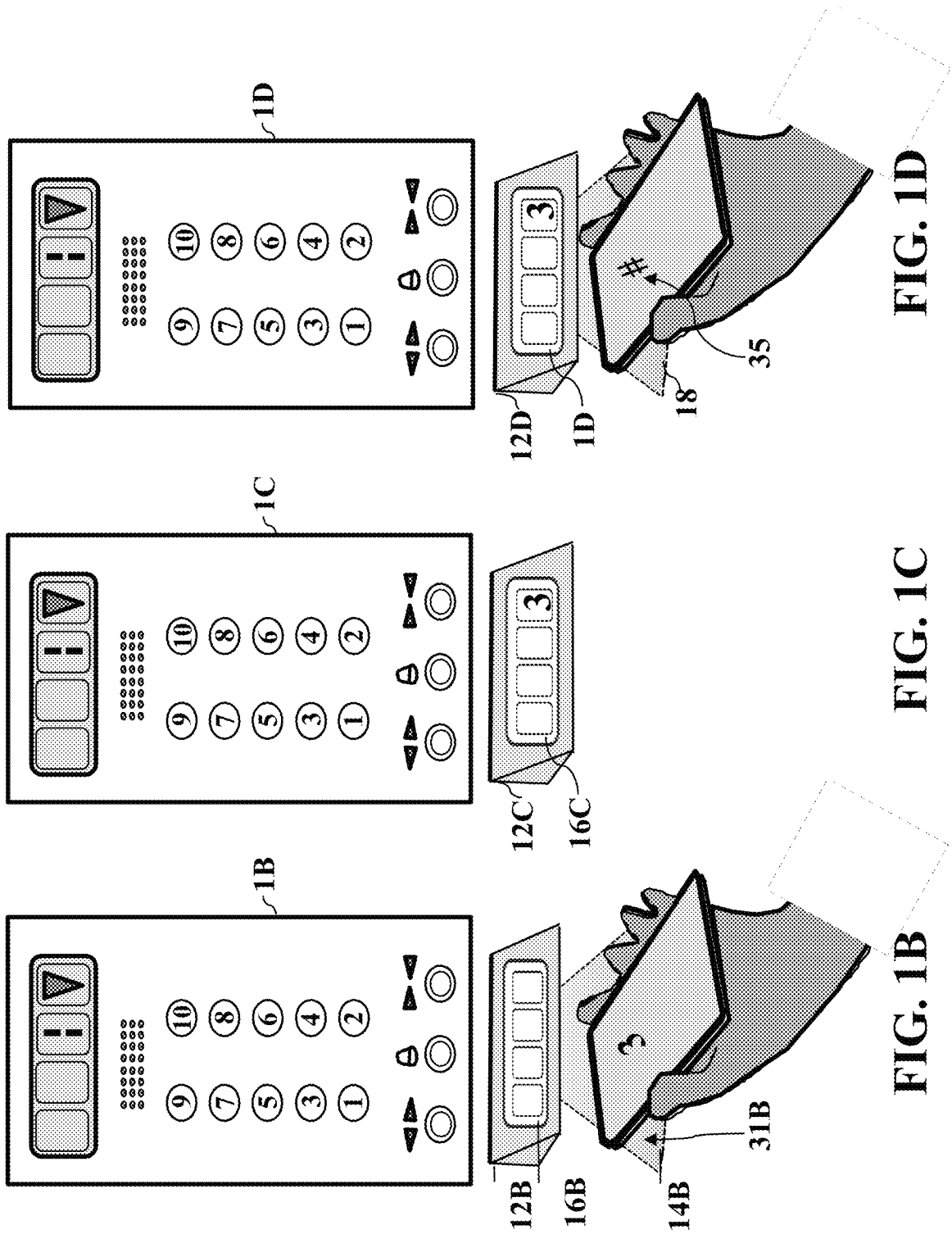

(Moving Sidewalk)

(Wheelchair lift)

(Dumbwaiter)

CONTACTLESS ELEVATOR SERVICE FOR AN ELEVATOR BASED ON AUGMENTED DATASETS

The present disclosure relates generally to vision recognition systems, and more particularly to vision recognition system to activate elevator service without the need to touch the elevator panel/buttons.

BACKGROUND

Conventional elevator hall call buttons utilize microstroke mechanical switches, other conventional methods use proximity sensing, and still other conventional methods use optical patterns. However, conventional call buttons are complicated mechanical structures having a large number of parts, thereby being costly to manufacture in contrast with the function served, and being subject to mechanical wear. Such conventional buttons have ridges and crevices which not only accumulate grime and bacteria but also make it difficult to clean them. The foregoing problems are compounded in environments such as doctor's offices and hospitals, as well as in factories where work is performed, and bacteria and filth are passed from one passenger via the elevator button and hence to other passengers. Conventional buttons require some sort of human contact, even in the so-called proximity sensing types. In order to register an elevator call, some sort of human contact is required, i.e. thumb, finger or other equally sized human part must actually be targeted directly on the button. This can be extremely difficult when a human is carrying groceries or other bundles and the view of one's own human hands is obscured, or when the fingers cannot be made free. Similarly, locating the precise position of a call button for a human so as to press or contact the elevator button is a very difficult task for the visually impaired. Maintenance costs for buttons with moving parts is very high, as well, along with the opportunity for damage due to vandalism and abusive use. Another problem faced with conventional elevator button is the ability to tailor the aesthetic appearance of hall call buttons in order to suit architectural design can be extremely difficult when it necessitates altering the mechanical structure thereof.

Conventional non-personal-contact electric switches are used when activation of an electric circuit is to be attained without employing a manually-actuated switch. These types of conventional manually-actuated switches are sources for the spread of communicable diseases or the spread of harmful substances to humans. An infected or contaminated person can press a particular conventional elevator switch at one point in time, and, at a later point in time, another person may become infected or contaminated by manually contacting the particular elevator switch. Therefore, to prevent the infection or contamination by a person using a switch in a publicly used environment, it would be desirable if a non-personal-contact electric switch were provided in a publicly used environment. Other publicly used environments where conventional manually-actuated switches are used include light switches in public buildings.

Some conventional non-personal-contact electric switches depends upon proximity to an electric conductor, and changes in capacitance activate the switch. Such conventional capacitance-based non-personal-contact electric switches would not be practical in publicly used environment. This is so because, for example, one person may wear gloves, and another person may not wear gloves. The changes in capacitance between a person wearing a glove and another person not wearing a glove may be difficult to account for in a capacitance-based non-personal-contact electric switch. In this respect, there is a need in the elevator contactless technology arena for a non-personal-contact method that can be used a publicly environment which does not depend upon capacitance sensing technology.

Another conventional elevator button related technology in non-personal-contact electric switches is based upon sensing a break in a light beam. Such a conventional technology does not depend upon whether a person is wearing a glove or not. In this respect, there is a need in the elevator contactless technology arena for a non-personal-contact method for a publicly used environment which uses a technology based upon non-contact activation of an elevator button. For example, U.S. Pat. No. 4,042,067 discloses an elevator system which employs either capacitance based proximity switches or touch contact switches. However, some problems associated with capacitance based switches and touch contact switches for switches used in a publicly used environment are problematic, as discussed above. U.S. Pat. No. 4,716,992 discloses an operating panel device for an elevator system that includes a two-dimensional matrix array of six light emitters and six light receivers to provide switching for eight switching choices. However, there are multiple problems with this conventional approach, such that if only one of the six light emitters or one of the six light receivers malfunction, the entire system is compromised. For example, the malfunction may either have two or four switching choices that would be deactivated, depending upon whether a row or column of switching choices in the two-dimensional matrix were malfunctioning. To avoid multiple switch malfunctions if only one light emitter or one light receiver malfunctions, it would be desirable to provide non-personal-contact electric switches in a publicly used environment, such as an elevator, which do not employ a two-dimensional matrix array of light emitters and light receivers to actuate plural switches.

The present disclosure addresses the elevator contactless elevator button technological needs of today's elevator industries and other related technology industries, by solving the conventional problems of contactless operation of elevator systems, by producing a vision recognition system that can activate elevator services without the need to touch the elevator panel/buttons.

SUMMARY

The present disclosure relates generally to vision recognition systems, and more particularly to vision recognition system to activate elevator service without the need to touch the elevator panel/buttons.

Some embodiments of the present disclosure, use a vision recognition system to activate elevator service without the need to touch elevator panel/buttons. Users show letters and/or digits for destination floors to a camera associated with the elevator to activate the corresponding elevator buttons. Provided is a letter/digit classifier and a user confirmation/cancellation mechanism, such that the vision recognition system is trained with synthesized training data to remove the need of manually collecting training data. The training data can be synthesized with a customized range of varieties in terms of font color, perspective transform, position, scale, font style, noise modeling, etc. to make the trained vision recognition system more robust with respect to these varieties.

However, in order to construct the embodiments of the present disclosure, experimentation included many experimental approaches that failed, from these failed experimentations many valuable realizations were realized. For example, some important components for developing these test experimental approaches thought to be important in order to implement robust touchless elevator service included: (1) reliably recognizing destination floors of elevator users without imposing many prerequisites on users and/or buildings where the elevators are deployed. For example, some prerequisites may have included installing specific apps on users' mobile devices or strong wifi signals in the elevator; (2) training the recognition system with low costs, including the costs associated with collecting training data to train the recognition system. Wherein, at least one realization was that the embodiments of the present disclosure needed a recognition system that robustly recognized users' destination floors with minimum cost and manual efforts while minimizing prerequisites on users and/or buildings where the elevators are deployed.

In order to develop such embodiments of the present disclosure there needs to be a better understanding of some of the problems that needed to be overcome to achieve the goals in developing a robust touchless elevator service. For example, some of these realized problems included discovering approaches where training and deploying a recognition system for touchless elevator services that can robustly recognize users' destination floors with minimum cost and manual efforts, while minimizing the prerequisites on users and/or buildings where the elevators are deployed. Upon having a good understanding of some of the problems to overcome, many test experimental approaches were tested in order to develop the embodiments of the present disclosure.

From the extensive experimentation, some embodiments of the present disclosure incorporated a solution that included the user may enter a floor number from a dialing pad or any text-based cell phone app, e.g., notepad, Google Docs, text message, calculator, etc. Wherein, the floor text may include L, LL, B1, etc., as well as digits, such that the user then presents the phone screen (or any artifacts at hand including the floor text) to a camera.

Another aspect realized from the extensive experimentation, was the realization that none of the experimental approaches tested offered users a mechanism to confirm or cancel their initial input, in case the recognition system misinterpreted the users' initial input, or that the users may have changed their minds, i.e. where the user wanted to deactivate a button which is already activated. What was believed to be the cause of this particular problem is that these experimental approaches did not consider at least one of the following:

(1) the burden these experimental approaches imposed on elevator users and the buildings where the elevators are deployed;
(2) the overall cost of building a reliable recognition system for touchless elevator service; and
(3) the failure of these experimental approaches to provide a mechanism in the recognition system for users to confirm or cancel their input.

Some embodiments of the present disclosure address the above realizations by developing an approach that includes a device for contactless elevator service operation of an elevator. The device can include an image sensor or multiple sensors to capture an image or images from a user. A memory is utilized to store data, where the data can include a trained neural network model and elevator training data. The elevator training data may have elevator identifiers of a set of elevators, and a set of elevator templates associated with the elevator training data. Such that each elevator includes a set of elevator identifiers associated with elevator services corresponding to an elevator template. Further, the device can include control circuitry that is utilized to generate synthetic text images for each training elevator identifier of the set of training elevator identifiers for a training elevator that corresponds to a training elevator template of the set of training elevator templates. Wherein each synthetic text image of the synthetic text images is a variation in at least one typeface parameter of at least one training elevator identifier of the set of training elevator identifiers. The control circuitry can also generate an augmented dataset of the synthetic text images for each training elevator identifier of the set of training elevator identifiers for the training elevator that corresponds to the training elevator template by an image transformation on the synthetic text images. Wherein the synthetic text images are augmented with different geometrical parameters and visual parameters to a predetermined number of variations in appearance to the set of training elevator identifiers. The neural network model can be trained using the augmented datasets as a synthetic training dataset. Such that the neural network model is trained to perform elevator identifier recognition After training, the trained neural network model can directly perform elevator identifier recognition on the captured image without the augmented datasets. In other words, the augmented datasets are not needed after deployment of the trained neural network model. Then, the trained neural network model can extract a text image portion from the captured image. So as, to detect at least an elevator identifier in the captured image based on the extracted text image portion and the trained neural network model. Wherein the extracted text image portion includes a training elevator identifier from the set of training elevator identifiers in the elevator training data. A display can be utilized to display the detected elevator identifier on the display for user confirmation or user cancellation, and upon user confirmation, the control circuitry can generate a control command based the detected elevator identifier associated elevator service. Wherein, the control circuitry can output the control command in order to activate or not activate the elevator service based on the control command.

Experimentation provided a depth of knowledge that assisted in developing some of the embodiments of the present disclosure, as well as assisted in providing a better understanding of some of the problems in the conventional contactless approaches. For example, some reasons why some of the embodiments of the present disclosure can solve the problems in the conventional contactless approaches are some embodiments of the present disclosure do not require users to install a specific QR code generating app on their mobile devices. Wherein, these embodiments do not require the users' mobile devices or the building to access or provide wifi, such that the specific QR code generating app can be accessed.

Another reason why some of the embodiments of the present disclosure can solve the problems in the conventional contactless approaches is some embodiments of the present disclosure do not require the users to know and find the correspondence between a destination floor and a gesture. Wherein, these embodiments also do not require the users to perform any gesture other than showing a floor text to a camera. In addition, showing the floor text to the camera does not occupy a lot of space or require a large amount of space, which incidentally makes these embodiments more practical, especially when the elevator is crowded or near full capacity.

Still, another reason why some of the embodiments of the present disclosure can solve the problems in the conventional contactless approaches is due to the number of sensors needed to operate these embodiments. For example, one 1 sensor such as a camera is required, more cameras are contemplated, however, to operate these embodiments a single camera is sufficient. Further, the number of sensors of these embodiments of the present disclosure is independent of the number of floors, such that these embodiments are more scalable to large commercial applications such as skyscrapers which have a large number of floors. Further still, a user is less likely to accidentally activate other unrelated floor buttons when using these embodiments, when compared to the conventional contactless elevator approaches, due to the confirmation mechanism feature. In fact, these embodiments of the present disclosure provide for a mechanism for users to confirm or cancel their input if the users change their mind or the recognition system, i.e. classifier misclassifies the user input.

Experimentation

As noted above, several aspects were learned from experimentation, including that none of the test experiments offered users a way to confirm or cancel their input in case the recognition system misinterpreted the users' input, or if the users change their minds where the user wanted to deactivate the button which was already activated. What was later realized what may be the cause of this problem is that while conducting these test experiments or in the developments of these experiments, there was a consideration of at least one of the following: (1) the burden the test experiments imposed on the elevator users and the buildings where the elevators are deployed; (2) the amount of costs to construct a reliable recognition system for touchless elevator service; and (3) a way or mechanism incorporated into the recognition system that provided or allowed for users to either confirm or cancel their input.

For example, some test experimental approaches included a touchless elevator journey that required users to install a specific QR code generating app (either installing offline or on-spot via wifi) on the user's personal mobile devices, so as to use a QR code reader to recognize the QR code associated with the destination floor presented by the users. However, there were many problems realized with this experimental approach including that if users did not have mobile devices which can install this particular app, or that there was no/weak wifi connection on-spot (i.e. the buildings do not provide wifi or any connection issues on users' mobile devices), then the users cannot operate the elevator touchlessly. Thus, such a test experimentation approach was not further tested or researched.

Another test experimental approach included developing a touchless gesture recognition for Elevator Service, which required users to know unique gestures corresponding to that specific elevator service, i.e. requesting a destination floor, and perform such unique gesture associated with the destination floor in a limited space of the elevator. Wherein the performed unique gesture can be recognized by the gesture recognition system and activate the corresponding elevator services. However, many critical problems were later realized with this experimental approach, namely, that users had problems performing the unique gestures when the elevator was near half or full capacity because of the limited space in the elevator. In fact, users found trying to figure out how to perform the unique gestures correctly very difficult, or even performing the correct unique gesture at all. Other major problems realized with this test experimental approach included that handicapped or injured users could not perform the unique gestures, or user carrying personal items could not put down the personal items on the floor due to the high capacity of users in the elevator. Based on the many realized problems this experimental solution resulted in being impractical and certainly defeated the purpose of touchless elevator service for hygiene reasons, for example.

Still another experimental approach included developing a contactless button for the elevator that required ultrasonic and infrared proximity sensors, wherein the buttons installed represented buttons associated with the elevator services. For example, users could activate a specific button by moving close to the corresponding proximity sensor. However, what was realized as unsurmountable problems to overcome with this particular test experimentation included the cost of implementation and impracticality for users to use the approach. For example, because the number of proximity sensors needed to operate the experimental approach was proportional to the number of elevator buttons, this turned out to be not scalable and resulted in being very costly to implement this solution. Also realized is that this specific experimental approach was impractical when the elevator was crowded because the users in front of the proximity sensors accidentally activated multiple buttons beyond users' intention. Thus, for these reasons and other reasons, the particular test experimental approach was not further tested.

Practical Applications

Some practical applications the embodiments of the present disclosure can include contactless elevator operation for elevators, including but not limited to the elevators for passengers and/or goods/food.

According to an embodiment of the present disclosure, a device for real-time contactless elevator service operation of an elevator. The device including a memory to store data. The data includes a trained neural network (TNN) model. Wherein the TNN model is trained using augmented datasets as a synthetic training dataset via a training processor, to perform elevator identifier recognition. Such that the augmented data sets are generated from synthetic text images for each training elevator identifier of a set of training elevator identifiers for an elevator that corresponds to a training elevator template of a set of training elevator templates by an image transformation on the synthetic text images. Wherein the synthetic text images are augmented with different geometrical parameters and visual parameters to a predetermined number of variations in appearance to the set of training elevator identifiers. An image sensor to capture one or more real-time images from a user. A processor in real-time is to extract a text image portion from the one or more captured images using the TNN model. Detect at least an elevator identifier in the extracted text image portion using the extracted text image portion and the TNN model. Display the detected elevator identifier on a display for user confirmation or user cancellation, and upon user confirmation, generate a control command based the detected elevator identifier associated elevator service. Output the control command to activate or not activate the elevator service based on the control command.

According to another embodiment of the present disclosure, a device for real-time contactless elevator service operation of an elevator. The device including control circuitry is configured to accessed from a cloud computer via a communication network connected with the device a trained neural network (TNN) model, and store the TNN in a memory. Wherein the TNN is trained using a training processor with elevator training data. The elevator training data includes elevator training identifiers for a set of training elevators, and a set of elevator training templates associated with the elevator training data, each training elevator of the set includes a set of training elevator identifiers associated with elevator training services corresponding to an elevator training template. Receive in real-time via an image sensor one or more user images. Extract a text image portion from the one or more user images using the TNN model. Detect at least an elevator identifier in the one or more user images based on the extracted text image portion and the TNN model. Display the detected elevator identifier on a display for user confirmation or user cancellation, and upon user confirmation, generate a control command based the detected elevator identifier associated elevator service. Output the control command to activate or not activate the elevator service based on the control command.

According to another embodiment of the present disclosure, a method for real-time contactless elevator service operation of an elevator. The method including accessing a memory having stored data, the stored data includes a trained neural network (TNN) model. Wherein the TNN model is trained using augmented datasets as a synthetic training dataset via a training processor, to perform elevator identifier recognition. Such that the augmented data sets are generated from synthetic text images for each training elevator identifier of a set of training elevator identifiers for an elevator that corresponds to a training elevator template of a set of training elevator templates by an image transformation on the synthetic text images. Wherein the synthetic text images are augmented with different geometrical parameters and visual parameters to a predetermined number of variations in appearance to the set of training elevator identifiers. Receiving in real-time one or more user images. Extracting a text image portion from the one or more captured user images using the TNN model. Detecting at least an elevator identifier in the one or more captured user images based on the extracted text image portion and the TNN model. Displaying the detected elevator identifier on a display for user confirmation or user cancellation, and upon user confirmation, generate a control command based the detected elevator identifier associated elevator service. Outputting the control command to activate or not activate the elevator service based on the control command.

According to another embodiment of the present disclosure, a device operating in real-time for contactless conveyance service operation of a conveyance system, the conveyance system is associated with one of a dumbwaiter, a moving sidewalk or a wheelchair lift. The device including a transceiver that accepts from a cloud-based computer a trained neural network (TNN) model and stores the TTN model in a memory. Wherein the TNN model is trained by a cloud-based computer using augmented datasets as a synthetic training dataset, in order to later perform conveyance identifier recognition after the training is complete. Such that the augmented data sets are generated from synthetic text images for each training conveyance identifier of a set of training conveyance identifiers for a conveyance system that corresponds to a training conveyance template of a set of training conveyance templates by an image transformation on the synthetic text images. Wherein the synthetic text images are augmented with different geometrical parameters and visual parameters to a predetermined number of variations in appearance to the set of training conveyance identifiers. A user guided mechanism having a display, to assist a user in positioning text information within a target area of an image sensor, before the image sensor is to capture user images. Wherein the user positions the text image in the target area, and then the image sensor captures one or more real-time user images. A processor in real-time is to extract a text image portion from the one or more captured real-time user images using the TNN model. Detect at least a conveyance identifier in the extracted text image portion from the one or more captured real-time user images based on the extracted text image portion and the TNN model. Display the detected conveyance identifier on the display for user confirmation or user cancellation, and upon user confirmation, generate a control command based the detected conveyance identifier associated a conveyance service. Output the control command to activate or not activate the conveyance service based on the control command. Wherein the conveyance system is associated with a dumbwaiter, an escalator, a moving sidewalk, a wheelchair lift, etc.

According to another embodiment of the present disclosure, a non-transitory machine-readable medium including instructions stored thereon which, when executed by processing circuitry, configure the processing circuitry to perform operations for real-time contactless elevator service operation of an elevator. The non-transitory machine-readable medium includes accessing a memory having stored data, the stored data includes a trained neural network (TNN) model and stores the TTN model in a memory. Wherein the TNN model is trained using a training processor that uses augmented datasets as a synthetic training dataset, to produce a distribution of classified text images. Such that upon completion of training, the TNN is configured to perform elevator identifier recognition. Wherein the augmented data sets are generated from synthetic text images for each training elevator identifier of a set of training elevator identifiers for an elevator that corresponds to a training elevator template of a set of training elevator templates by an image transformation on the synthetic text images. Wherein the synthetic text images are augmented with different geometrical parameters and visual parameters to a predetermined number of variations in appearance to the set of training elevator identifiers. Receiving one or more user images. Extracting a text image portion from the one or more user images using the TTN model. Detecting at least an elevator identifier in the one or more user images based on the extracted text image portion and the trained neural network model. Wherein the extracted text image portion includes an elevator identifier from the set of training elevator identifiers in the elevator training data. Displaying the detected elevator identifier on a display for user confirmation or user cancellation, and upon user confirmation, generate a control command based the detected elevator identifier associated elevator service. Outputting the control command to activate or not activate the elevator service based on the control command.

According to another embodiment of the present disclosure, a computerized system including an image sensor to capture an image from a user. One or more processors, and one or more computer storage media storing computer-useable instructions that, when used by the one or more processors, cause the one or more processors to access a memory having a trained neural network (TNN) model. The TNN model is trained using a training processor that uses augmented datasets as a synthetic training dataset, to produce a distribution of classified text images, such that upon completion of training. The TNN is configured to perform elevator identifier recognition, wherein the augmented data sets are generated from synthetic text images for each training elevator identifier of a set of training elevator identifiers for an elevator that corresponds to a training elevator template of a set of training elevator templates by an image transformation on the synthetic text images. Wherein the synthetic text images are augmented with different geometrical parameters and visual parameters to a predetermined number of variations in appearance to the set of training elevator identifiers. Extract a feature representation from the captured image using the TNN model. Detect at least an elevator identifier in the captured image based on the extracted feature representation and the TNN model. Display the detected elevator identifier on a display for user confirmation or user cancellation, and upon user confirmation, generate a control command based the detected elevator identifier associated elevator service. Output the control command to activate or not activate the elevator service based on the control command.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 1B, FIG. 1C and FIG. 1D are schematics illustrating method steps of the device of FIG. 1A, according to some embodiments of the present disclosure;

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Figure 1A:
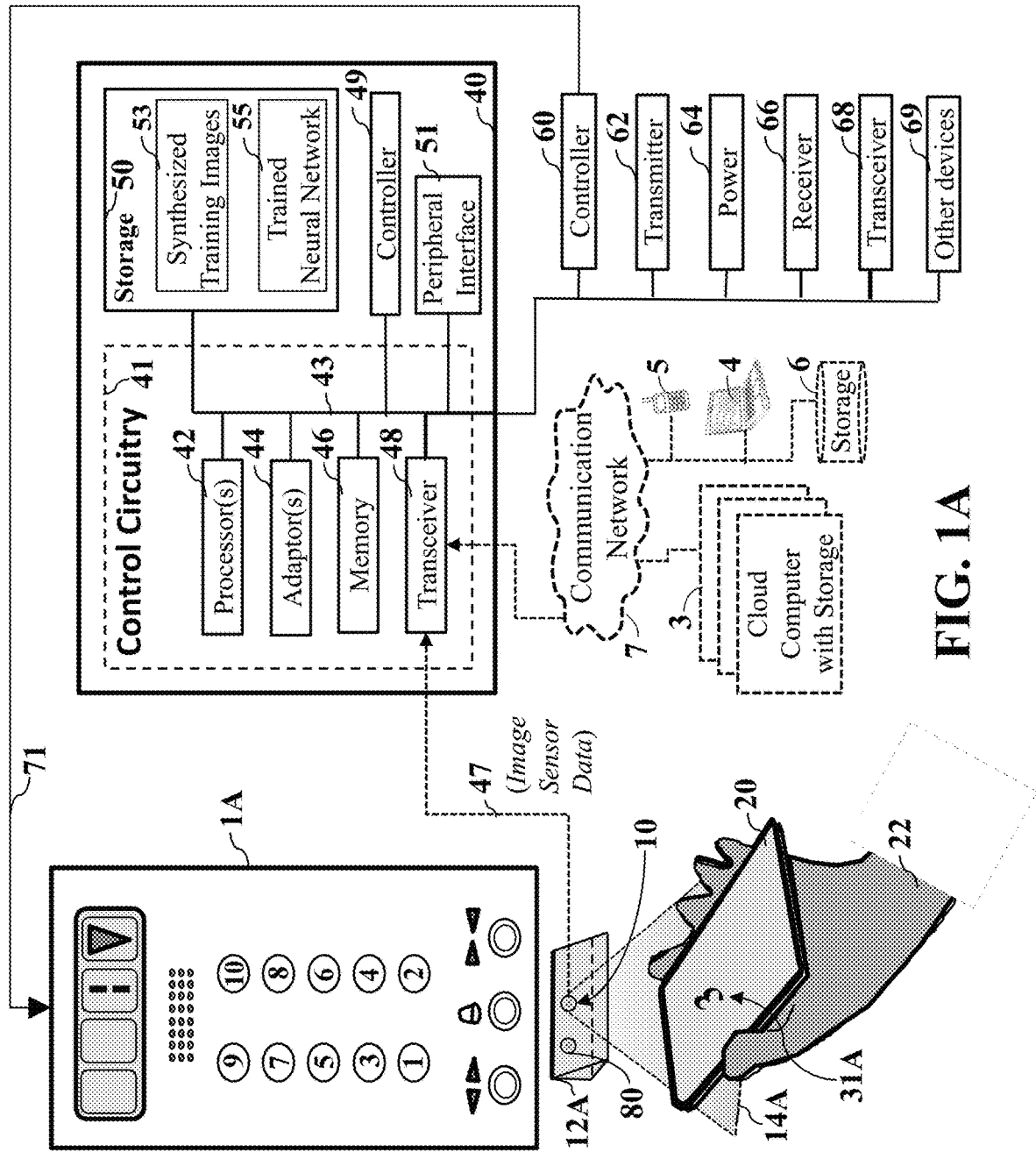
FIG. 1A is a block diagram illustrating a device for contactless elevator service operation of an elevator, according to some embodiments of the present disclosure.

FIG. 1A is a block diagram illustrating a device for contactless elevator service operation of an elevator, according to some embodiments of the present disclosure. The device 40 can include control circuitry 41 that includes a processor 42, adaptors 44 such as display adaptors, mouse adaptors, printer adaptors, etc., a memory 46 and a transceiver 48 that operates as input and output devices, that are connected by buses 43.

The memory 46 can be configured to store executable instructions. The executable instructions may be stored or organized in any manner and at any level of abstraction, such as in connection with one or more applications, processes, routines, procedures, methods, functions, etc. The instructions stored in the memory 46 may be executed by one or more processors, such as a processor 42. The processor 42 may be coupled to the transceiver 48 or to one or more input/output (I/O) devices (not shown). The transceiver 48 (or I/O device(s)) can be configured to provide an interface to allow a user to interact with the device 40. The buses 43 can be connected to other devices 69, which can include I/O device(s)), keyboards or keypads, touchscreens or touch panels, display screens, microphones, speaker, a mouse, a button, a remote control, a joystick, a printer, a telephone, mobile device (e.g., a smartphone), a sensor, an alternate computer system, etc. Such that, if required the above other devices can also include an adaptor of the adaptors 44. The memory 46 can store data from one or more sensors, such as a two-dimensional (2D) or three-dimensional (3D) sensor. The data can be processed by the processor 42 to control one or more parameters associated with operating the device 40. The data may include data indicative of an environment or scene captured by one or more sensors, including temperature, humidity, noise data that may be included in the environment/scene.

Also connected to the buses 43 can be a storage device 50 that can include a trained neural network 55 and other data. Further, depending upon the needs of the user a controller 49 can be connected to the buses 43.

The device 40 is connected to a communication network 7. The communication network can be connected to one or more cloud computers 3 that can include storage. Other components connected with the communication network can include a storage unit 6, one or more laptop computers 4 as well as one or more mobile devices 5.

The device 40 can also be connected to a controller 60, a transmitter 62, a power supply or multiple power supplies 64, a receiver 66 and a transceiver 68, via the buses 43. Contemplated is that the controller 60, the transmitter 62, the power supply 64, the receiver 66 and the transceiver 68, can all utilize the transceiver 48 for operation via the buses 43. The controller 60 is also connected to the elevator panel 1A via the connection 71 using wires or wirelessly to send control signals to the elevator panel 1A. Other components disclosed in the present disclosure can be connected to the elevator panel 1A as well as connected to other elevator components of an elevator (not shown) which may depend upon a user specific operational goals and requirements. Contemplated is that one or more servers (not shown) can be configured to communicate with the device 40 via the communication network 7. Some examples of the one or more servers (not shown) may include, one or more application servers, one or more cloud servers, one or more web servers, one or more database servers, one or more file servers, one or more mainframe servers.

The device 40 is connected to an elevator access panel 1A, an image sensor 10, and a user display guide camera 80. The camera 10 and user display guide camera can optionally be covered by a privacy cover 12A. The image sensor 10 can be a camera associated with the elevator to activate the elevator services corresponding elevator buttons, the camera 10 includes a target area 14A that captures a real-time image of a text related to the elevator service, when presented by a user that positions the text in the target area 14A of the camera 10. In some embodiments, the image sensor 10 such as a camera, may be implemented as an integrated unit of the device 40 or a separate device.

The user mobile device 20 can display one of, letters, numerals, symbols, alphanumeric patterns, specific to identifiers associated with the elevator services including one of, an elevator floor number, opening or closing an elevator door, accessing an elevator phone, keeping the elevator door open for a period of time or some other elevator service related action.

The camera 10 can be located in an elevator (not shown), in a hallway (not shown) approximate elevator doors (not shown) located on a floor (not shown) of a building (not shown), or both. Wherein the elevator services can include activating a button by users from a hallway on a floor, to request an elevator to travel along an X-axis direction or along a Y-axis direction from an initial location, to the user's location, and then, upon the user entering the elevator and the user indicating a destination location, the elevator travels to the requested user destination floor. Further, the captured images from the target area 14A of the camera 10 may a high dynamic range images, and JPEG images. The image sensor or camera 10 can be configured to transmit or otherwise communicate the captured image(s) as input to the device 40 for processing.

The user enters text information 31A into the mobile device 20 and displays the text information 31A to the target area 14A of the camera 10, the user can extend the user's hand 22 in an approximate area within the target area 14A, for the user text information 31A to be captured by the camera 10 as a capture image, i.e. capture image data 47.

Figure 3:
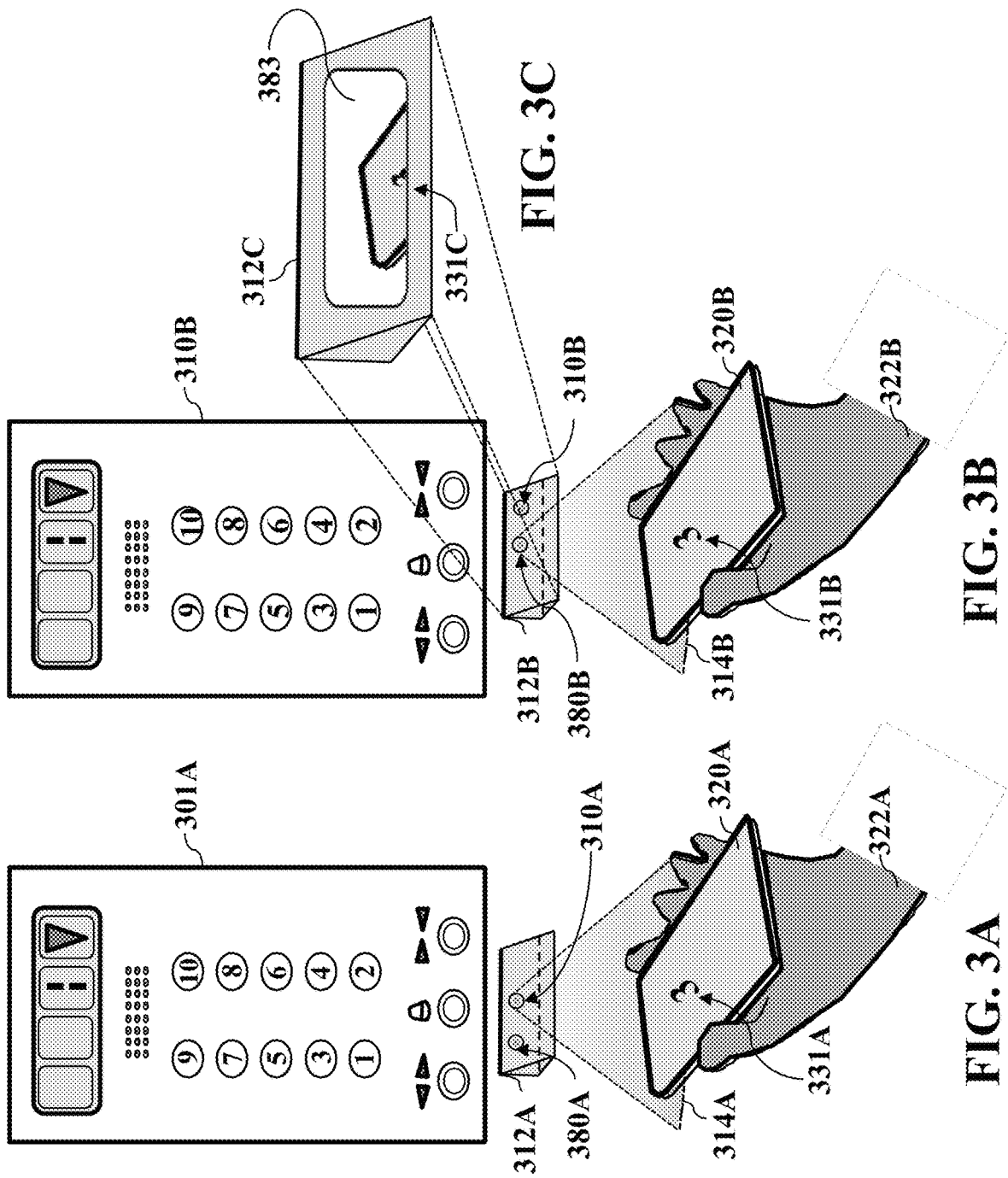
FIG. 3A, FIG. 3B and FIG. 3C are schematics illustrating some steps for implementing a user guided display mechanism that can be located within an elevator car or at an opening of an elevator floor of a multi-floor building, according to some embodiments of the present disclosure.

A user guided display mechanism (see FIG. 3) can include a camera 80 which is in communication with a display 16C (see FIG. 1B) mounted on top of the privacy cover 12A, to display a pre-captured real-time image (see X83 of FIG. 3), to assist users with aligning their text information 31A in the target area 14A, before the user text information 31A is acquired in the target area 14A by the camera 10 as the captured real-time image 47.

Alternatively, the user can hand write non-electronic text information related to the elevator service onto a non-electronic surface configured for displaying text information, before presenting the non-electronic text to the target area 14A of the camera 10. Then, the user can utilize the user guided display mechanism (see FIG. 3) to ensure the user text information 31A is in the target area 14A, before the user text information 31A is acquired in the target area 14A by the camera 10.

The target area 14A of the camera 10 can be configured to only capture real-time images associated with user text information 31A, such that the camera 10 can be directed toward a floor location, such as an elevator floor or a floor of a building, so as to result in a camera target area that avoids capturing user privacy data or other data not associated with the user text information. Also, possible is that to ensure user privacy data an amount of a camera focal depth with a level of camera focus of the camera 10, can be adjusted to ensure the camera 10 only captures real-time images associated with the user text and not user privacy data. In other words, any objects beyond the level of camera focus will be out of focus of the camera 10, such that the level of the focal depth can be set or controlled by a setting to a camera controller (not shown) by an operator.

Alternatively or optionally, the device 40 can include feedback devices (not shown) to provide an affirmative indication to a user that the user text information 31A has been recognized. The feedback devices may include audio or visual equipment. In some embodiments, the feedback may simply indicate that a gesture has been recognized. In some embodiments, the feedback may indicate a type of action that the device 40 recognized. A user is able to confirm the feedback before elevator resources are provisioned for the requested service/functionality. In this respect, the feedback devices may communicate bi-directionally and may be used to provide for interactivity between the device 40 and a user of the device 40.

Contemplated is that the device 40 may further include a video display adapter 44 for communicating a displayable image to a display device, such as display device 69. Examples of a display device 69 can include, a liquid crystal display (LCD), a cathode ray tube (CRT), a plasma display, a light emitting diode (LED) display, and any combinations thereof. Display adapter 44 and display device 69 may be utilized in combination with the processor(s) 42 to provide graphical representations of aspects of the present disclosure. In addition to a display device 69, the alternate computer system 69 may include one or more other peripheral output devices (not shown) including, an audio speaker, a printer, and any combinations thereof. Further, the other devices 69 can include peripheral output devices connected to buses 43 via a peripheral interface 51. Examples of a peripheral interface 51 include, a serial port, a USB connection, a FIREWIRE connection, a parallel connection, and any combinations thereof.

FIG. 1B, FIG. 1C and FIG. 1D are schematics illustrating method steps of the device of FIG. 1A, according to some embodiments of the present disclosure. FIG. 1B shows that the user presents the user text information 31B (in this example, floor '3') in the target area 14B.

FIG. 1C illustrates that the display 16C shows the detected user text information such that the user can verify whether his or her text information 31B is correctly recognized. The display 16C can also show the instructions to the user to guide the user what to do next. Example instructions can be (but not limited to): if the user's text information 31B is the same as what is shown on the display 16C, please present a pre-defined reserved symbol (for example, the '#' sign) 35 in the target area 18 to confirm, as shown in FIG. 1D. If the user chooses to confirm the recognized text information displayed on 16C, the control circuitry 41 in FIG. 1A will light the corresponding button on the panel 1D and initiate the elevator operation corresponding to the recognized text information displayed on 16C. If the corresponding button on the panel 1D is already lit before the user presents the confirmation symbol 35, after the user presents the confirmation symbol 35, the corresponding button on the panel 1D will be unlit and the corresponding elevator operation will be canceled.

In other words, the user can deactivate the already activated button and elevator operation by presenting the corresponding text information 31B again. If the user chooses not to confirm the recognized text information displayed on 16C (in other words, the user does not present a pre-defined reserved symbol 35 in the target area 18 within a pre-defined time period, say, a few seconds), the recognized text information will no longer be displayed on 16C. The method we just describe here can be one of the mechanisms for user to confirm/activate or cancel/deactivate the elevator operations.

Figure 1E:
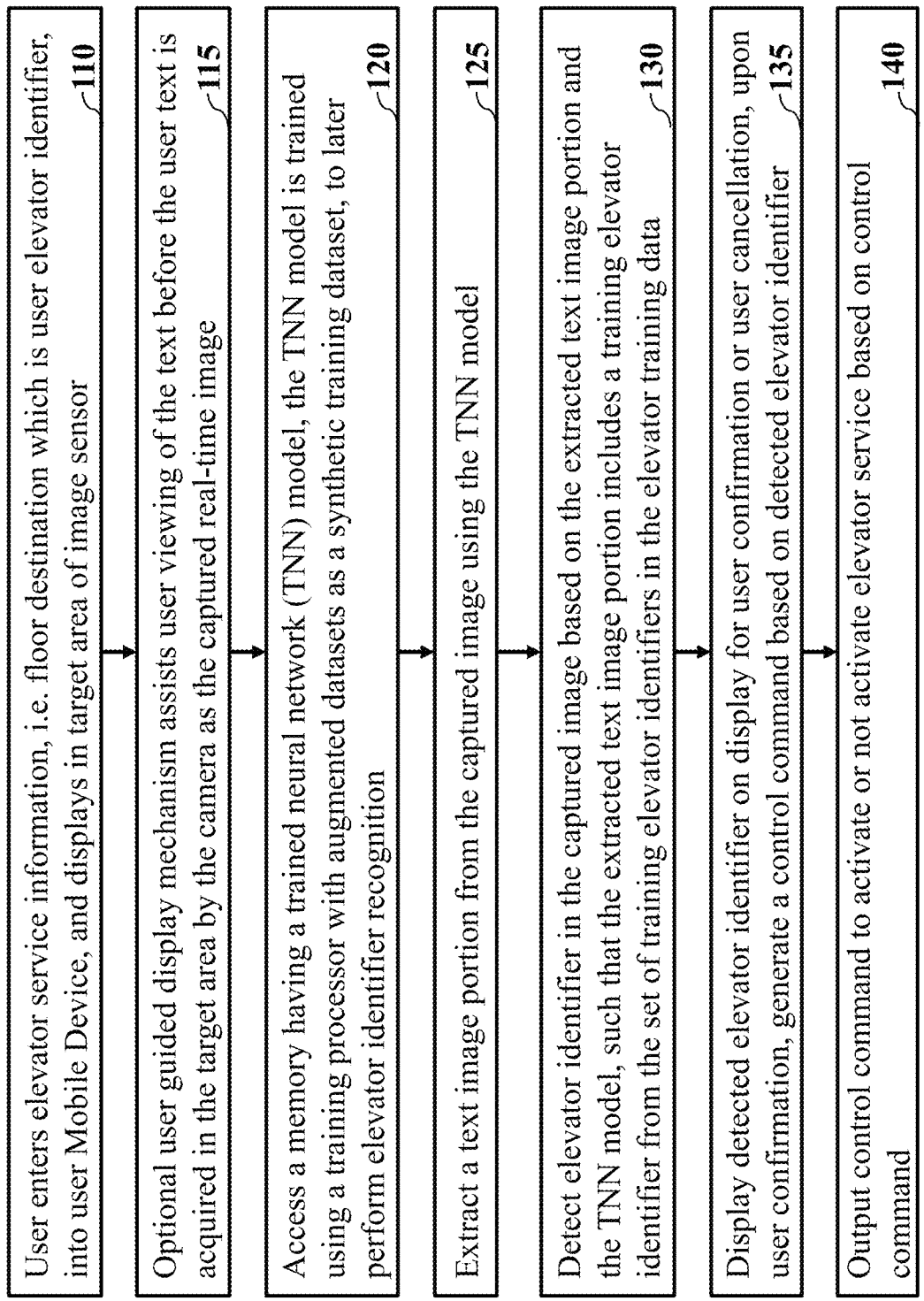
FIG. 1E is a schematic illustrating a method for contactless elevator service operation of an elevator, according to some embodiments of the present disclosure.

FIG. 1E is a block diagram illustrating a method for contactless elevator service operation of an elevator, according to some embodiments of the present disclosure.

Step 110 of method can include a user enters elevator service information, i.e. floor destination which is user elevator identifier, into user Mobile Device, and displays in target area of image sensor.

Step 115 of FIG. 1E can include optionally a user guided display mechanism assists user viewing of the text before the user text is acquired in the target area by the camera as the captured real-time image.

Step 120 of FIG. 1E can include access a memory having a trained neural network (TNN) model, the TNN model is trained using augmented datasets as a synthetic training dataset, to perform elevator identifier recognition, i.e. the TNN directly performs elevator identifier recognition on the captured image. Further, it is understood that after deployment of the TNN no access to the training dataset is required after the deployment of TNN.

Step 125 of FIG. 1E can extract a text image portion from the captured image, which this operation is done by TNN which needs no access to the augmented dataset.

Step 130 of FIG. 1E can include detect elevator identifier in the captured image based on the extracted text image portion and the TNN model, such that the extracted text image portion includes a training elevator identifier from the set of training elevator identifiers in the elevator training data.

Step 135 of FIG. 1E can include display detected elevator identifier on display for user confirmation or user cancellation, upon user confirmation, generate a control command based on detected elevator identifier.

Step 140 of FIG. 1E can include Output control command to activate or not activate elevator service based on control command.

Figure 2:
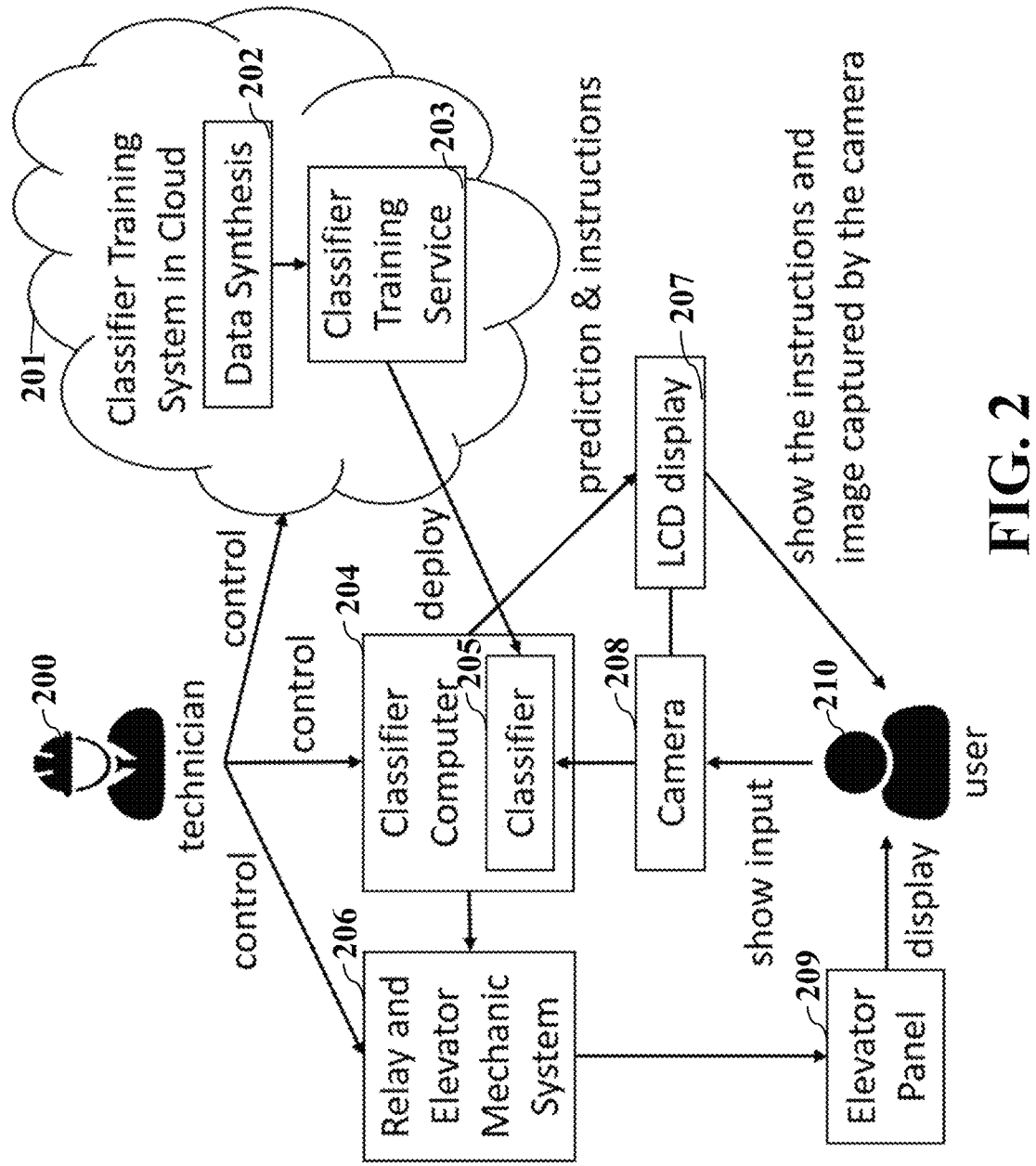
FIG. 2 is a schematic illustrating some process steps for the device, according to some embodiments of the present disclosure.

FIG. 2 is a schematic illustrating some process steps for the device, according to some embodiments of the present disclosure. FIG. 2 shows that the technician 200 controls the classifier training system 201 in the external computing facilities (for example, the cloud computing facilities), the classifier computer 204 where the trained classifier 205 can be deployed, and the relay and elevator mechanic system 206 to perform elevator services. Before the elevator start operating, the technician 200 first initiate the classifier training system 201 such that a synthesized dataset is generated by the data synthesis module 202 and that a classifier is trained using the synthesized dataset in the classifier training service 203 of external computing facilities. After the classifier is trained, the classifier is deployed in the classifier computer 204 as the classifier 205 by the technician 200. After the elevator start operating, the LCD display 207 can display information and instructions to guide the user 210 how to launch the elevator service (for example, asking the user 210 to show the text information associated with the destination floor to the camera 208). After the user 210 presents the text information to the camera 208, the captured image is fed as the input of the classifier 205 in the classifier computer 204. The classifier computer 204 will send the text information recognized by the classifier 205 and the associated instructions to the LCD display 207 such that the LCD display 207 can show them along with the image captured by the camera 208 to the user 210. The classifier computer 204 will also send the relay and elevator mechanic system 206 the commands associated with the text information recognized by the classifier 205 such that the elevator service can be performed. The elevator panel 209 connected to the relay and elevator mechanic system 206 will display to the user 210 what elevator operations are activated (for example, all the destination floors of the users). The entire system in FIG. 2 will continuously operate unless being interrupted by the technician 200.

FIG. 3A, FIG. 3B and FIG. 3C are schematics illustrating some steps for implementing a user guided display mechanism that can be located within an elevator car or at an opening of an elevator floor of a multi-floor building, according to some embodiments of the present disclosure.

For example, FIG. 3A illustrates the user, which is shown as a user's hand 322A, presenting text information 331A, i.e. shown as the number "3", portrayed by a user's phone 320A in a target area 314A of a camera 310A. The camera 310A can be protected by a privacy cover 312A, such that the privacy cover 312A also protects a user display guide camera 380A. The user display guide camera 380A can be optionally activated when the user presents the text information 331A shown as the number "3" via the user's phone 320A, in the target area 314A of the camera 310A. The camera 310A, user display guide camera 380A and privacy cover 312A can be located approximate an elevator panel 301A, approximate an elevator door opening on a floor of the multi-floor building (not shown), or some other convenient location for elevator operations access by users.

FIG. 3B illustrates that after activation of the user display guide camera 380A, the user's text information 331B, i.e. shown as the number "3", is reproduced or displayed in a display 383 of FIG. 3C. The display 383 of FIG. 3C can be mounted on top of the privacy cover 312C or some other convenient location for users to view while presenting text information to the camera 310B. The user adjusts the placement of the user's phone 320B according to how the user's text information, i.e. shown as the number "3", is positioned in the display 383 of FIG. 3C, in order for the camera 310B to correctly record the user text information to be read as an input to the device, to acknowledge a user command, i.e. in this case the user command is requesting to the elevator to take the user to FLOOR 3.

FIG. 3C illustrates that the user has not presented the user text information 331C correctly, since the user text information 331C is not fully displayed in the display 383. Thus, the user needs to further adjust the placement the user text information shown as number "3", so the number "3" can be completely viewed in the display 383. Upon the user text information 331B being correctly centered within the display 383, then the camera 310B can capture an image of the user text information 331B which can be used as an input to the device. The captured image is then accepted by the device to be processed for the device to figure out the user's command, which in this particular instance, is the user wanting to go to floor 3 from an initial floor location. The display of FIG. 3C acts as assistance to the user to guide the placement of the user phone 322B in a correct location for the camera 310B to capture an image that can be accepted and understood by the device for figuring out a solution to the user input, i.e. text information 331B.

As noted above, the device extracts the text image portion from one or more captured images of the user text information 331B, in this case shown as number "3", and based on a resemblance between the text image portion and at least one augmented text image, the TNN model detects at least an elevator identifier in the one or more captured images (i.e. based on the extracted text image portion and the TNN model). Wherein the extracted text image portion includes a training elevator identifier from the set of training elevator identifiers in the elevator training data, which is detected.

The detected elevator training identifier is displayed for user confirmation or user cancellation, and upon user confirmation, a control command is generated based the detected elevator identifier associated elevator service. Wherein the control command is outputted to activate or not activate the elevator service based on the control command.

Features

A device for real-time contactless elevator service operation of an elevator. The device including control circuitry is configured to accessed from a cloud computer via a communication network connected with the device a trained neural network (TNN) model, and store the TNN in a memory. Wherein the TNN is trained using a training processor with elevator training data. The elevator training data includes elevator training identifiers for a set of training elevators, and a set of elevator training templates associated with the elevator training data, each training elevator of the set includes a set of training elevator identifiers associated with elevator training services corresponding to an elevator training template. Receive in real-time via an image sensor one or more user images. Extract a text image portion from the one or more user images using the TNN model. Detect at least an elevator identifier in the one or more user images based on the extracted text image portion and the TNN model. Display the detected elevator identifier on a display for user confirmation or user cancellation, and upon user confirmation, generate a control command based the detected elevator identifier associated elevator service. Output the control command to activate or not activate the elevator service based on the control command. Contemplated is that the system, can include any combination of the different aspects listed below, regarding the above device. In particular, the following aspects are intended to either individually or in combination, create one or more embodiments based on the one or more combination of aspects listed below, for the above recited device.

An aspect may be that the image sensor is a camera having a target area for capturing the one or more images, such that a portion of the camera is covered by a privacy cover, and wherein a user guided display mechanism has a user guided display mounted on an outside surface of the privacy cover, to assist the user in positioning the text information within the target area of the camera, before the one or more images are captured by the camera.

Another aspect can include the training processor that generates the synthetic text images during training based on the steps of accessing stored elevator training data from a training memory. The stored elevator training data can include training elevator identifiers of the set of elevators, and the set of training elevator templates associated with the elevator training data. Wherein each training elevator includes a set of training elevator identifiers associated with elevator services corresponding to a training elevator template. Generate synthetic text images for each training elevator identifier of the set of training elevator identifiers for a training elevator that corresponds to a training elevator template of the set of training elevator templates. Wherein each synthetic text image of the synthetic text images is a variation in at least on typeface parameter of at least one training elevator identifier of the set of training elevator identifiers, in order to obtain the augmented datasets. Wherein the extracted text image portion includes an elevator identifier from the set of training elevator identifiers in the elevator training data, such that the elevator identifier and the set of training elevator identifiers includes one of, letters, numerals, symbols, alphanumeric patterns, specific to identifiers associated with the elevator services including one of, an elevator floor number, opening or closing an elevator door, accessing an elevator phone, keeping the elevator door open for a period of time or some other elevator service related action.

An aspect is that the elevator identifier and the set of training elevator identifiers includes one of, letters, numerals, symbols, alphanumeric patterns, specific to identifiers associated with the elevator services including one of, an elevator floor number, opening or closing an elevator door, accessing an elevator phone, keeping the elevator door open for a period of time or some other elevator service related action.

An aspect can be that the image sensor is a camera that includes a target area that captures a real-time image, when a user positions the text in the target area of the camera, such that a portion of the camera is covered by a privacy cover, wherein the privacy also covers a portion of a user guided camera, such that the privacy cover includes a user guided display mechanism having a user guided display mounted on an outside surface of the privacy cover that assists users to position the text information within the target area for the camera to capture the one or more images.

Further an aspect is the image sensor is located in an elevator, approximate an elevator door opening on a floor of a building, or both, in order to capture images associated with a user requesting elevator services, such that the elevator services includes one of, activating an operation of an elevator to travel along an X-axis direction or along a Y-axis direction from an initial location, to a destination location, such as a destination floor from a user initial location.

As an aspect the user can enter the text related to the elevator service into one of, a mobile device, a calculator or an electronic device configured to display text, before presenting the text into the target area of the camera.

Another aspect is the user hand writes the text related to the elevator service onto one of, a non-electronic surface configured for displaying text or an electronic surface configured for displaying text, before presenting the text into the target area of the camera.

For example, an aspect is a target area of the image sensor is configured to only capture the real-time image associated with the user text, such that the image sensor is a camera that is either: (1) directed to a floor location, such as an elevator floor or a floor of a building resulting in the target area that avoids capturing user privacy data or other data not associated with the user text; or (2) includes an amount of a camera focal depth with a level of camera focus resulting in the camera only capturing real-time images associated with the user text, so that any data or objects beyond the level of camera focus is out of focus, wherein the level of the focal depth is controlled by a setting to a camera controller by an operator.

An aspect is the control circuitry extracts a set of text image portions from the captured one or more images by TNN model. Wherein the control circuitry searches for a plurality of alphanumeric patterns, present in the set of elevator identifiers specific to the elevator training data, in the extracted set of text image portions after applying an optical character recognition on the extracted set of text image portions.

Another aspect is the geometrical parameters used during training that are applied to augment the synthetic text images correspond to one or a subset of, a set of rotation parameters, a set of scaling parameters, a set of font style parameters, a set of perspective transform parameters, a set of shape parameters, or a set of orientation parameters.

Another possible aspect is the visual parameters used during training that are applied to augment the synthetic text images correspond to one or a subset of a set of color parameters, a set of contrast parameters, a set of external lighting parameters, a set of brightness parameters, a set of shade parameters, a set of noise modeling parameters, a set of background parameters including a set of color parameters, a set of noise modeling parameters, or a set of visual image variable parameters.

Another aspect is that the TNN model includes two or more neural networks, or a subset of different types of artificial neural networks, such that the two or more neural networks and the subset of different types of artificial neural networks includes at least one or a combination of, a convolutional neural network (CNN), a feedforward neural network, a recurrent neural network, or a modular neural network. Wherein the control circuitry segments a plurality of alphanumeric characters arranged in a specific sequence for each augmented text image in the augmented dataset.

Another aspect further comprising, output, by the control circuitry, an alert control command to an elevator operator in a real time or a near-real time, in response when the detected elevator identifier is associated with the elevator service for accessing an elevator phone, such that the alert control command is generated, wherein the generated alert control command is outputted to a communication network associated with the elevator operator and connected to the control circuitry.

Contemplated is that an aspect in training is each synthetic text image of the synthetic text images is augmented with adding different types of noise, including but not limited to Gaussian noise, to the synthetic text image to simulate the noise in the captured images.

An aspect in training is the captured text image includes an image background, such that each synthetic text image of the synthetic text images is augmented with filling the image background of the synthetic text image with a gradient simulating a shading effect.

Another aspect in training is each synthetic text image of the synthetic text images is augmented with randomly perturbing the synthetic text image by an affine transformation.

Another aspect in training is each synthetic text image of the synthetic text images is augmented with resizing the synthetic text image to different heights and widths by a plurality of different aspect ratios.

Another aspect in training is each synthetic text image of the synthetic text images is augmented with adding random blurring effects, including but not limited to Gaussian blur, to the synthetic text image.

Another aspect in training further comprising predicting an identity of at least an elevator identifier in the captured image using optical character recognition (OCR), wherein the predicting is based at least in part on a particular distribution of classified text image in the distribution of classified text images.

An aspect is that alternatively, the processor 42 of FIG. 1A may be configured to train the neural network model using augmented datasets as a synthetic training dataset. Wherein the processor 42 of FIG. 1A can then extract a text image portion from the captured image using the TNN model. Examples of the processor 42 of FIG. 1A can be an Application-Specific Integrated Circuit (ASIC) processor, a Complex Instruction Set Computing (CISC) processor, and/or other hardware.

Another optional aspect of the device can include a network interface that can include an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS). Such components of the device 40 can depend upon a specific user goals and requirements. Further, depending upon the user's specific design architecture, the device can include a I/O device having to receive inputs and outputs from devices. Examples of the input devices may include a touch screen, a keyboard, a mouse, a joystick, a microphone, and/or an image sensor. Examples of the output devices may include a display screen (such as a Liquid Crystal Display (LCD) or a Light Emitting Diode (LED) display) and/or a speaker.

Another aspect can include that the image sensor 40 can be implemented via a charge-coupled device technology or complementary metal-oxide-semiconductor technology. Some examples of implementations of the image sensor 10 can include, a closed-circuit television camera, a digital camera, a camcorder, and an action camera.

Definitions

According to aspects of the present disclosure, and based on experimentation, the following definitions have been established, and certainly are not a complete definition of each phrase or term. Wherein the provided definitions are merely provided as an example, based upon learnings from experimentation, wherein other interpretations, definitions, and other aspects may pertain. However, for at least a mere basic preview of the phrase or term presented, such definitions have been provided. Further, the definitions below cannot be viewed as prior art since the knowledge gained is from experimentation only.

Convolutional neural network (CNN): CNN is a deep learning neural network designed for processing structured arrays of data such as images. CNNs can be widely used in computer vision such as image classification. CNNs are very good at picking up on patterns in input image, such as lines, gradients, circles, or even eyes and faces. It is this property that makes CNNs so powerful for computer vision, such that CNNs can operate directly on a raw image data and do not need any preprocessing. CNNs is a feed-forward neural network, often with up to 20 or 30 layers, wherein the power of a convolutional neural network comes from a special kind of layer called the convolutional layer. CNNs contain many convolutional layers stacked on top of each other, each one capable of recognizing more sophisticated shapes. With three or four convolutional layers it is possible to recognize handwritten digits and with 25 layers it is possible to distinguish human faces.

The architecture of CNNs includes a multi-layered feed-forward neural network, made by stacking many hidden layers on top of each other in sequence. It is this sequential design that allows CNNs to learn hierarchical features. The hidden layers are typically convolutional layers followed by activation layers, some of them followed by pooling layers. A simple CNN that aids understanding of the core design principles is capable of recognizing handwritten characters. At least one key building block in CNNs is the convolutional layer. We can visualize a convolutional layer as many small square templates, called convolutional kernels, which slide over the image and look for patterns. Where that part of the image matches the kernel's pattern, the kernel returns a large positive value, and when there is no match, the kernel returns zero or a smaller value. Mathematically, the kernel is a matrix of weights. Despite CNNs simplicity, the ability to detect vertical or horizontal lines, corners, curves, and other simple features, is an extremely powerful property of the convolution kernel. We recall that a convolutional layer is made up of a series of convolution kernels. Typically, the first layer of a convolutional neural network contains a vertical line detector, a horizontal line detector, and various diagonal, curve and corner detectors. These feature detector kernels are not programmed by a human but in fact are learned by the neural network during training, and serve as the first stage of the image recognition process.

Some active functions in CNNs are that after passing an image through a convolutional layer, the output is normally passed through an activation function. Common activation functions include the sigmoid function. and the ReLU function (i.e., also known as the rectified linear unit, which is the same as taking the positive component of the input). The activation function has the effect of adding non-linearity into the convolutional neural network. If the activation function was not present, all the layers of the neural network could be condensed down to a single matrix multiplication. In the case of the cat image above, applying a ReLU function to the first layer output results in a stronger contrast highlighting the vertical lines, and removes the noise originating from other non-vertical features.

An aspect of the CNNs is the repeating structure, such that A basic convolutional neural network can be viewed as a series of convolutional layers, followed by an activation function, followed by a pooling (downscaling) layer, repeated many times. With the repeated combination of these operations, the first layer detects simple features such as edges in an image, and the second layer begins to detect higher-level features. By the tenth layer, a convolutional neural network is able to detect more complex shapes such as eyes. By the twentieth layer, it is often able to differentiate human faces from one another. This power comes from the repeated layering of operations, each of which can detect slightly higher-order features than its predecessor. Later layers in the neural network are able to build on the features detected by earlier layers and identify ever more complex shapes.

Typeface vs Font Style: A typeface is a set of characters of the same design. These characters include letters, numbers, punctuation marks, and symbols. Some popular typefaces include Arial, Helvetica, Times, and Verdana. While most computers come with a few dozen typefaces installed, there are thousands of typefaces available. Because they are vector-based (not bitmaps), typefaces can be scaled very large and still look sharp. The term "typeface" is often confused with "font," which is a specific size and style of a typeface. For example, Verdana is a typeface, while Verdana 10 pt bold is a font. It's a small difference, but is good to know.

Figure 4:
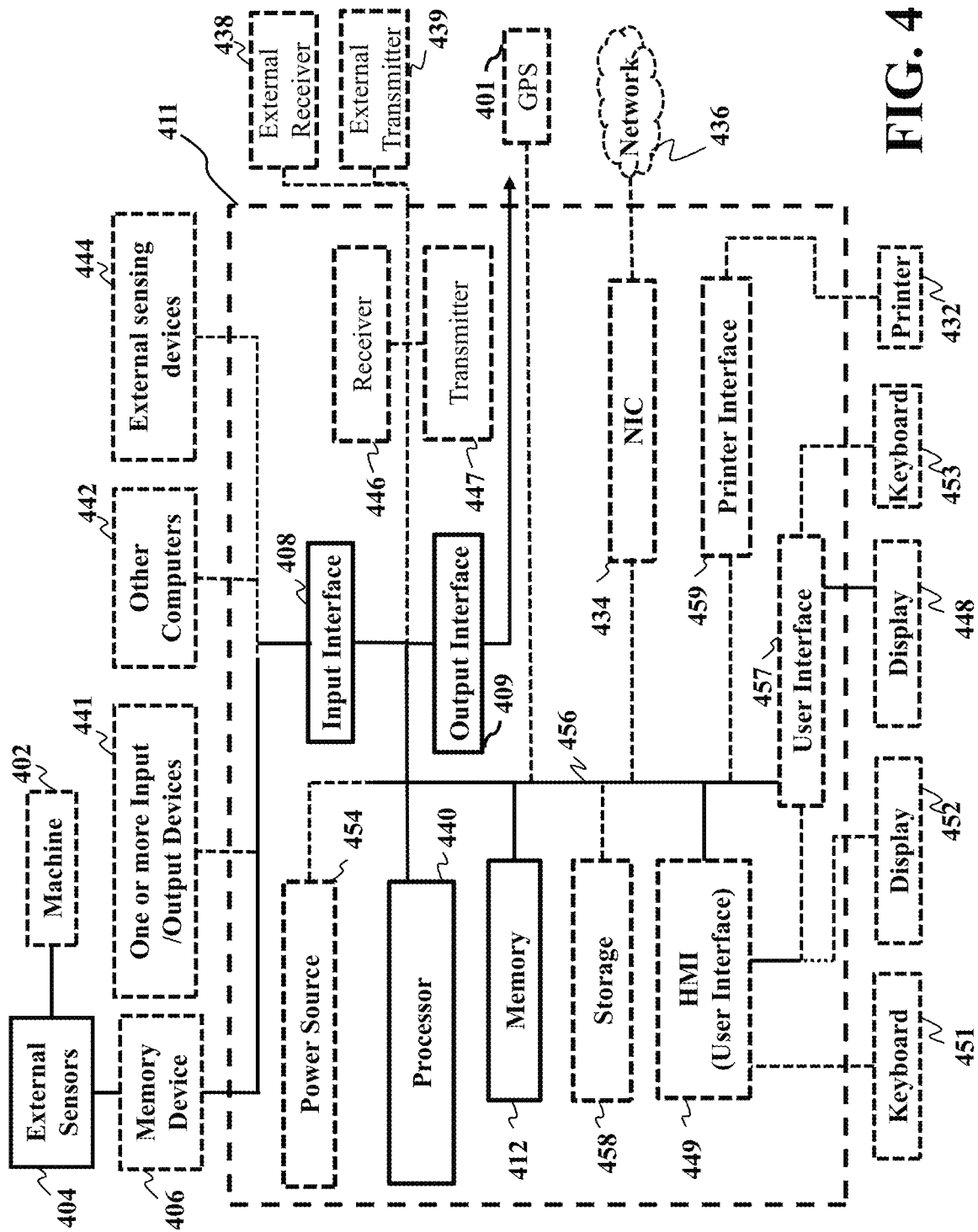
FIG. 4 is a block diagram of illustrating the method of FIG. 1A, that can be implemented using an alternate computer or processor, according to some embodiments of the present disclosure.

FIG. 4 is a block diagram of illustrating the method of FIG. 1A, that can be implemented using an alternate computer or processor, according to embodiments of the present disclosure. The computer 411 includes a processor 440, computer readable memory 412, storage 458 and user interface 449 with display 452 and keyboard 451, which are connected through bus 456. For example, the user interface 457 in communication with the processor 440 and the computer readable memory 412, acquires and stores the image data in the computer readable memory 412 upon receiving an input from a surface, keyboard 453, of the user interface 457 by a user.

The computer 411 can include a power source 454, depending upon the application the power source 454 may be optionally located outside of the computer 411. Linked through bus 456 can be a user input interface 457 adapted to connect to a display device 448, wherein the display device 448 can include a computer monitor, camera, television, projector, or mobile device, among others. A printer interface 459 can also be connected through bus 456 and adapted to connect to a printing device 432, wherein the printing device 432 can include a liquid inkjet printer, solid ink printer, large-scale commercial printer, thermal printer, UV printer, or dye-sublimation printer, among others. A network interface controller (NIC) 434 is adapted to connect through the bus 456 to a network 436, wherein image data or other data, among other things, can be rendered on a third-party display device, third party imaging device, and/or third-party printing device outside of the computer 411. The computer/processor 411 can include a GPS 401 connected to bus 456.

Still referring to FIG. 4, the image data or other data, among other things, can be transmitted over a communication channel of the network 436, and/or stored within the storage system 458 for storage and/or further processing. Further, the time series data or other data may be received wirelessly or hard wired from a receiver 446 (or external receiver 438) or transmitted via a transmitter 447 (or external transmitter 439) wirelessly or hard wired, the receiver 446 and transmitter 447 are both connected through the bus 456. The computer 411 may be connected via an input interface 408 to external sensing devices 444 and external input/output devices 441. The input interface 408 can be connected to one or more input/output devices 441, external memory 406, external sensors 404 which may be connected to a machine-like device 402. For example, the external sensing devices 444 may include sensors gathering data before-during-after of the collected time-series data of the machine. The computer 411 may be connected to other external computers 442. An output interface 409 may be used to output the processed data from the processor 440. It is noted that a user interface 449 in communication with the processor 440 and the non-transitory computer readable storage medium 412, acquires and stores the region data in the non-transitory computer readable storage medium 412 upon receiving an input from a surface 452 of the user interface 449 by a user.

Figure 5B:
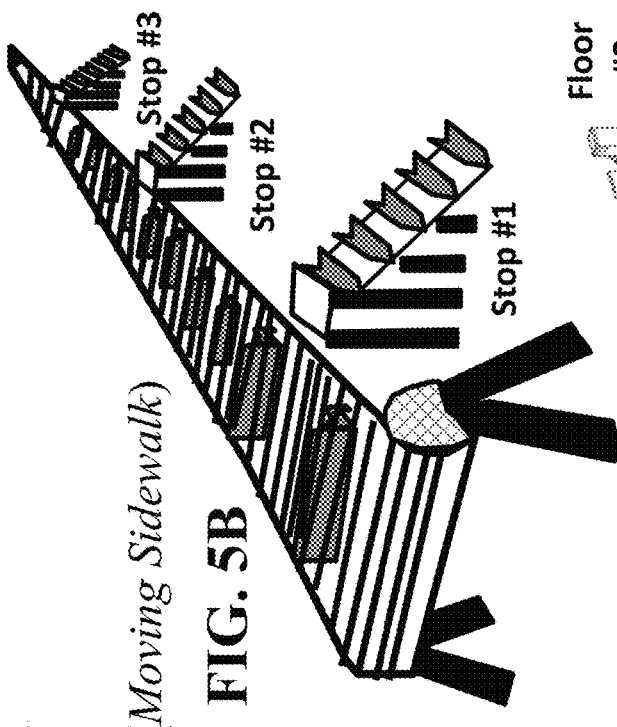
FIG. 5B is a schematic illustrating a moving sidewalk, according to some embodiments of the present disclosure.
Figure 5C:
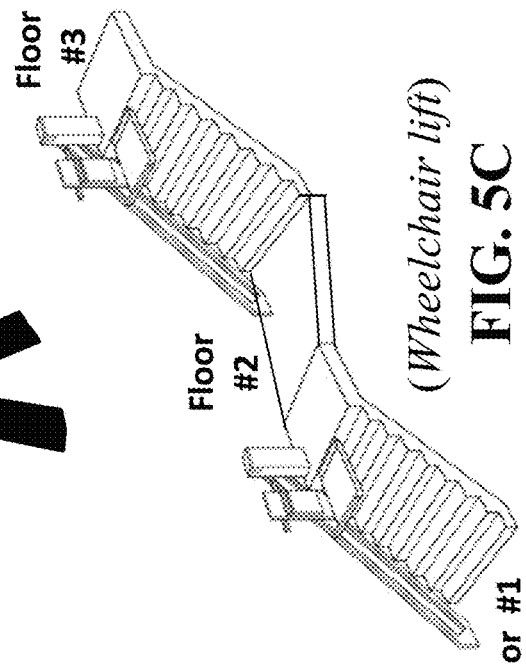
FIG. 5C is a schematic illustrating a wheelchair lift, according to some embodiments of the present disclosure.
Figure 5A:
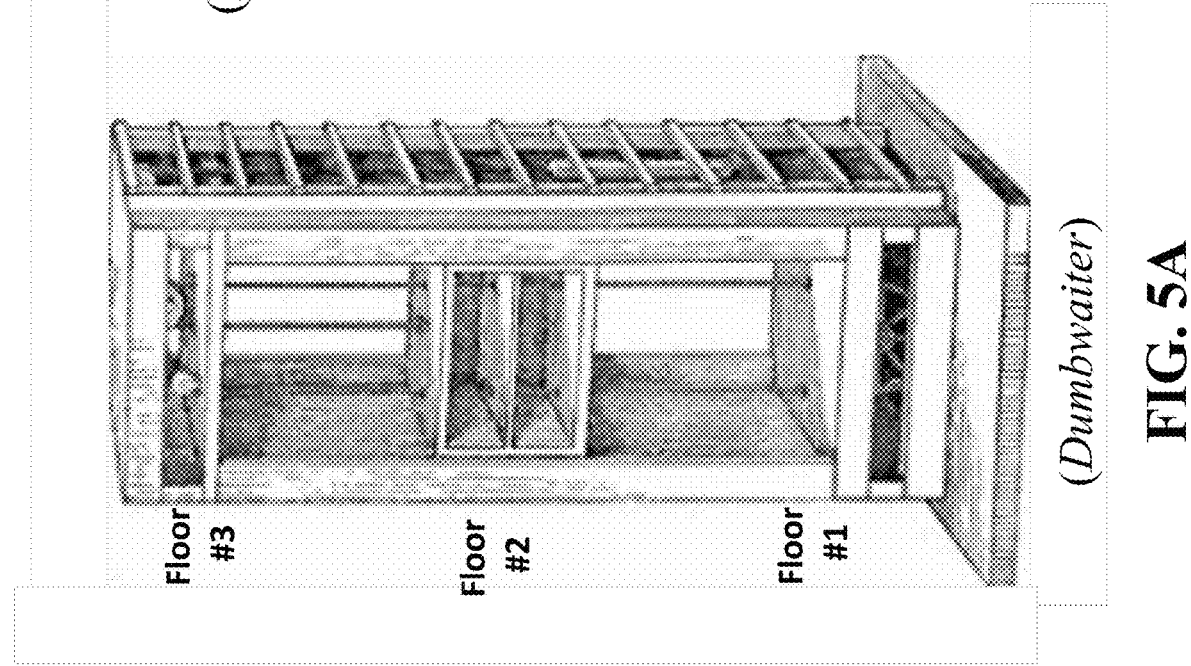
FIG. 5A is a schematic illustrating a dumbwaiter, according to some embodiments of the present disclosure.

FIG. 5A, FIG. 5B and FIG. 5C are a schematic illustrating different embodiments that the device can be incorporated into different systems, for example, FIG. 5A is a conveyance system that can be associated with a dumbwaiter, FIG. 5B is a moving sidewalk, and FIG. 5C is a wheelchair lift.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as first, second, in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A device for real-time contactless elevator service operation of an elevator, comprising:
    a memory to store data, the data includes a trained neural network (TNN) model, wherein the TNN model is trained using augmented datasets as a synthetic training dataset via a training processor, to later perform elevator identifier recognition, such that the augmented data sets are generated from synthetic text images for each training elevator identifier of a set of training elevator identifiers for an elevator that corresponds to a training elevator template of a set of training elevator templates by an image transformation on the synthetic text images, wherein the synthetic text images are augmented with different geometrical parameters and visual parameters to a predetermined number of variations in appearance to the set of training elevator identifiers;
    an image sensor to capture in real-time one or more images from a user;
    a processor in real-time is to:
        extract a text image portion from the one or more captured images using the TNN model, and detect at least an elevator identifier in the extracted text image portion using the extracted text image portion and the TNN model;
        display the detected elevator identifier on a display for user confirmation or user cancellation, and upon user confirmation, generate a control command based the detected elevator identifier associated elevator service; and
        output the control command to activate or not activate the elevator service based on the control command.

2. The device of claim 1, wherein the image sensor is a camera having a target area for capturing the one or more images, such that a portion of the camera is covered by a privacy cover, and wherein a user guided display mechanism has a user guided display mounted on an outside surface of the privacy cover, to assist the user in positioning the text information within the target area of the camera, before the one or more images are captured by the camera.

3. The device of claim 1, wherein the training processor generates the synthetic text images during training based on the steps of:

access stored elevator training data from the memory, the stored elevator training data includes training elevator identifiers of the set of elevators, and the set of training elevator templates associated with the elevator training data, wherein each training elevator includes a set of training elevator identifiers associated with elevator services corresponding to a training elevator template; and generate synthetic text images for each training elevator identifier of the set of training elevator identifiers for a training elevator that corresponds to a training elevator template of the set of training elevator templates, wherein each synthetic text image of the synthetic text images is a variation in at least on typeface parameter of at least one training elevator identifier of the set of training elevator identifiers, in order to obtain the augmented datasets.

4. The device of claim 1, wherein the extracted text image portion includes a elevator identifier from the set of training elevator identifiers in the elevator training data, such that the elevator identifier and the set of training elevator identifiers includes one of, letters, numerals, symbols, alphanumeric patterns, specific to identifiers associated with the elevator services including one of, an elevator floor number, opening or closing an elevator door, accessing an elevator phone, keeping the elevator door open for a period of time or some other elevator service related action.

5. A device for real-time contactless elevator service operation of an elevator, comprising:

control circuitry is configured to accessed from a cloud computer via a communication network connected with the device a trained neural network (TNN) model, and store the TNN in a memory, wherein the TNN is trained using a training processor with elevator training data, the elevator training data includes elevator training identifiers for a set of training elevators, and a set of elevator training templates associated with the elevator training data, each training elevator of the set includes a set of training elevator identifiers associated with elevator training services corresponding to an elevator training template;

receive via an image sensor in real-time one or more user images;

extract a text image portion from the one or more user images using the TNN model, and detect at least an elevator identifier in the one or more user images based on the extracted text image portion and the TNN model;

display the detected elevator identifier on a display for user confirmation or user cancellation, and upon user confirmation, generate a control command based the detected elevator identifier associated elevator service; and output the control command to activate or not activate the elevator service based on the control command.

6. The device of claim 5, wherein the training processor is to generate synthetic text images for each training elevator identifier of the set of training elevator identifiers for a training elevator that corresponds to an elevator training template of the set of elevator training templates, wherein each synthetic text image of the synthetic text images is a variation in at least one typeface parameter of at least one training elevator identifier of the set of training elevator identifiers;

generate an augmented dataset of the synthetic text images for each training elevator identifier of the set of training elevator identifiers for the training elevator that corresponds to the elevator training template by an image transformation on the synthetic text images, wherein the synthetic text images are augmented with different geometrical parameters and visual parameters to a predetermined number of variations in appearance to the set of training elevator identifiers; and use the augmented datasets as a synthetic training dataset to train the neural network, such that upon the neural network model being trained, a trained neural network (TNN) model can perform elevator identifier recognition on a captured non-training image, such that the TNN model is either stored in the memory or in a memory of the cloud computer.

7. The device of claim 5, wherein the elevator identifier and the set of training elevator identifiers includes one of, letters, numerals, symbols, alphanumeric patterns, specific to identifiers associated with the elevator services including one of, an elevator floor number, opening or closing an elevator door, accessing an elevator phone, keeping the elevator door open for a period of time or some other elevator service related action.

8. The device of claim 5, wherein the image sensor is a camera that includes a target area that captures a real-time image, when a user positions the text in the target area of the camera, such that a portion of the camera is covered by a privacy cover, wherein the privacy also covers a portion of a user guided camera, such that the privacy cover includes a user guided display mechanism having a user guided display mounted on an outside surface of the privacy cover that assists users to position the text information within the target area for the camera to capture the one or more images.

9. The device of claim 5, wherein the image sensor is located in an elevator, approximate an elevator door opening on a floor of a building, or both, in order to capture images associated with a user requesting elevator services, such that the elevator services includes one of, activating an operation of an elevator to travel along an X-axis direction or along a Y-axis direction from an initial location, to a destination location, such as a destination floor from a user initial location.

10. The device of claim 5, wherein the user enters the text related to the elevator service into one of, a mobile device, a calculator or an electronic device configured to display text, before presenting the text into the target area of the camera.

11. The device of claim 5, wherein the user hand writes the text related to the elevator service onto one of, a non-electronic surface configured for displaying text or an electronic surface configured for displaying text, before presenting the text into the target area of the camera.

12. The device of claim 5, wherein a target area of the image sensor is configured to only capture the real-time image associated with the user text, such that the image sensor is a camera that is either: (1) directed to a floor location, such as an elevator floor or a floor of a building resulting in the target area that avoids capturing user privacy data or other data not associated with the user text; or (2) includes an amount of a camera focal depth with a level of camera focus resulting in the camera only capturing real-time images associated with the user text, so that any data or objects beyond the level of camera focus is out of focus, wherein the level of the focal depth is controlled by a setting to a camera controller by an operator.

13. The device of claim 5, wherein the control circuitry extracts a set of text image portions from the captured one or more images by TNN model.

14. The device of claim 13, wherein the control circuitry searches for a plurality of alphanumeric patterns, present in the set of elevator identifiers specific to the elevator training data, in the extracted set of text image portions after applying an optical character recognition on the extracted set of text image portions.

15. The device of claim 5, wherein the geometrical parameters used during training that are applied to augment the synthetic text images correspond to one or a subset of, a set of rotation parameters, a set of scaling parameters, a set of font style parameters, a set of perspective transform parameters, a set of shape parameters, or a set of orientation parameters.

16. The device of claim 5, wherein the visual parameters used during training that are applied to augment the synthetic text images correspond to one or a subset of a set of color parameters, a set of contrast parameters, a set of external lighting parameters, a set of brightness parameters, a set of shade parameters, a set of noise modeling parameters, a set of background parameters including a set of color parameters, a set of noise modeling parameters, or a set of visual image variable parameters.

17. The device of claim 5, wherein the TNN model includes two or more neural networks, or a subset of different types of artificial neural networks, such that the two or more neural networks and the subset of different types of artificial neural networks includes at least one or a combination of, a convolutional neural network (CNN), a feed-forward neural network, a recurrent neural network, or a modular neural network.

18. The device of claim 17, wherein the control circuitry segments a plurality of alphanumeric characters arranged in a specific sequence for each augmented text image in the augmented dataset.

19. The device of claim 5, further comprising,
output, by the control circuitry, an alert control command to an elevator operator in a real time or a near-real time, in response when the detected elevator identifier is associated with the elevator service for accessing an elevator phone, such that the alert control command is generated, wherein the generated alert control command is outputted to a communication network associated with the elevator operator and connected to the control circuitry.

20. A method for real-time contactless elevator service operation of an elevator, comprising:
accessing a memory having stored data, the stored data includes a trained neural network (TNN) model, wherein the TNN model is trained using augmented datasets as a synthetic training dataset via a training processor, to perform elevator identifier recognition, such that the augmented data sets are generated from synthetic text images for each training elevator identifier of a set of training elevator identifiers for an elevator that corresponds to a training elevator template of a set of training elevator templates by an image transformation on the synthetic text images, wherein the synthetic text images are augmented with different geometrical parameters and visual parameters to a predetermined number of variations in appearance to the set of training elevator identifiers;
receiving in real-time one or more user images;
extracting a text image portion from the one or more captured user images using the TNN model;
detecting at least an elevator identifier in the one or more captured user images based on the extracted text image portion and the TNN model;
displaying the detected elevator identifier on a display for user confirmation or user cancellation, and upon user confirmation, generate a control command based the detected elevator identifier associated elevator service; and
outputting the control command to activate or not activate the elevator service based on the control command.

21. A device operating in real-time for contactless conveyance service operation of a conveyance system, the conveyance system is associated with one of a dumbwaiter, a moving sidewalk or a wheelchair lift, comprising:
a transceiver accepts from a cloud-based computer a trained neural network (TNN) model and stores the TTN model in a memory, wherein the TNN model is trained by a cloud-based computer using augmented datasets as a synthetic training dataset, in order to later perform conveyance identifier recognition after the training is complete, such that the augmented data sets are generated from synthetic text images for each training elevator identifier of a set of training conveyance identifiers for a conveyance system that corresponds to a training conveyance template of a set of training conveyance templates by an image transformation on the synthetic text images, and wherein the synthetic text images are augmented with different geometrical parameters and visual parameters to a predetermined number of variations in appearance to the set of training conveyance identifiers;
a user guided mechanism having a display, to assist a user in positioning text information within a target area of an image sensor, before the image sensor is to capture user images, wherein the user positions the text image in the target area, and then the image sensor captures one or more real-time user images;
a processor in real-time is to:
extract a text image portion from the one or more captured real-time user images using the TNN model, and detect at least a conveyance identifier in the extracted text image portion from the one or more captured real-time user images based on the extracted text image portion and the TNN model;
display the detected system identifier on the display for user confirmation or user cancellation, and upon user confirmation, generate a control command based the detected conveyance identifier associated a conveyance service; and
output the control command to activate or not activate the conveyance service based on the control command.

22. A non-transitory machine-readable medium including instructions stored thereon which, when executed by processing circuitry, configure the processing circuitry to perform operations for real-time contactless elevator service operation of an elevator, comprising:
access a memory having stored data, the stored data includes a trained neural network (TNN) model and stores the TTN model in a memory, wherein the TNN model is trained using a training processor that uses augmented datasets as a synthetic training dataset, to produce a distribution of classified text images, such that upon completion of training, the TNN is configured to perform elevator identifier recognition, wherein the augmented data sets are generated from synthetic text images for each training elevator identifier of a set of training elevator identifiers for an elevator that corresponds to a training elevator template of a set of training elevator templates by an image transformation on the synthetic text images, and wherein the synthetic text images are augmented with different geometrical parameters and visual parameters to a predetermined number of variations in appearance to the set of training elevator identifiers;

receiving one or more user images;

extracting a text image portion from the one or more user images using the TTN model;

detecting at least an elevator identifier in the one or more user images based on the extracted text image portion and the trained neural network model, wherein the extracted text image portion includes an elevator identifier from the set of training elevator identifiers in the elevator training data;

displaying the detected elevator identifier on a display for user confirmation or user cancellation, and upon user confirmation, generate a control command based the detected elevator identifier associated elevator service; and outputting the control command to activate or not activate the elevator service based on the control command.

23. A computerized system comprising:

an image sensor to capture an image from a user;

one or more processors; and one or more computer storage media storing computer-useable instructions that, when used by the one or more processors, cause the one or more processors to:

access a memory having a trained neural network (TNN) model, the TNN model is trained using a training processor that uses augmented datasets as a synthetic training dataset, to produce a distribution of classified text images, such that upon completion of training, the TNN is configured to perform elevator identifier recognition, wherein the augmented data sets are generated from synthetic text images for each training elevator identifier of a set of training elevator identifiers for an elevator that corresponds to a training elevator template of a set of training elevator templates by an image transformation on the synthetic text images, and wherein the synthetic text images are augmented with different geometrical parameters and visual parameters to a predetermined number of variations in appearance to the set of training elevator identifiers;

extract a feature representation from the captured image using the TNN model, and detect at least an elevator identifier in the captured image based on the extracted feature representation and the TNN model;

display the detected elevator identifier on a display for user confirmation or user cancellation, and upon user confirmation, generate a control command based the detected elevator identifier associated elevator service; and output the control command to activate or not activate the elevator service based on the control command.

24. The computerized system of claim 23, wherein the TNN model is trained by the training processor by access elevator training data from a training memory connected to the training processor, the elevator training data includes training elevator identifiers of a set of training elevators, and the set of training elevator templates associated with the elevator training data, wherein each training elevator includes the set of training elevator identifiers associated with elevator services corresponding to a training elevator template;

generate synthetic text images for each training elevator identifier of the set of training elevator identifiers for a training elevator that corresponds to a training elevator template of the set of training elevator templates using the control circuitry, wherein each synthetic text image of the synthetic text images is a variation in at least one typeface parameter of at least one training elevator identifier of the set of training elevator identifiers; and generate the augmented dataset of the synthetic text images for each training elevator identifier of the set of training elevator identifiers for the training elevator that corresponds to the training elevator template by the image transformation on the synthetic text images, wherein the synthetic text images are augmented with different geometrical parameters and visual parameters to a predetermined number of variations in appearance to the set of training elevator identifiers.

25. The computerized system of claim 23, wherein each synthetic text image of the synthetic text images is augmented with adding different types of noise, including but not limited to Gaussian noise, to the synthetic text image to simulate the noise in the captured images.

26. The computerized system of claim 23, wherein the captured text image includes an image background, such that each synthetic text image of the synthetic text images is augmented with filling the image background of the synthetic text image with a gradient simulating a shading effect.

27. The computerized system of claim 23, wherein each synthetic text image of the synthetic text images is augmented with randomly perturbing the synthetic text image by an affine transformation.

28. The computerized system of claim 23, wherein each synthetic text image of the synthetic text images is augmented with resizing the synthetic text image to different heights and widths by a plurality of different aspect ratios.

29. The computerized system of claim 23, wherein each synthetic text image of the synthetic text images is augmented with adding random blurring effects, including but not limited to Gaussian blur, to the synthetic text image.

30. The computerized system of claim 23, further comprising:

predicting an identity of at least an elevator identifier in the captured image using optical character recognition (OCR), wherein the predicting is based at least in part on a particular distribution of classified text image in the distribution of classified text images.

* * * * *